Feb. 14, 1956   G. M. YULICH   2,734,304
DIFFERENTIAL FLOAT
Filed Sept. 22, 1953
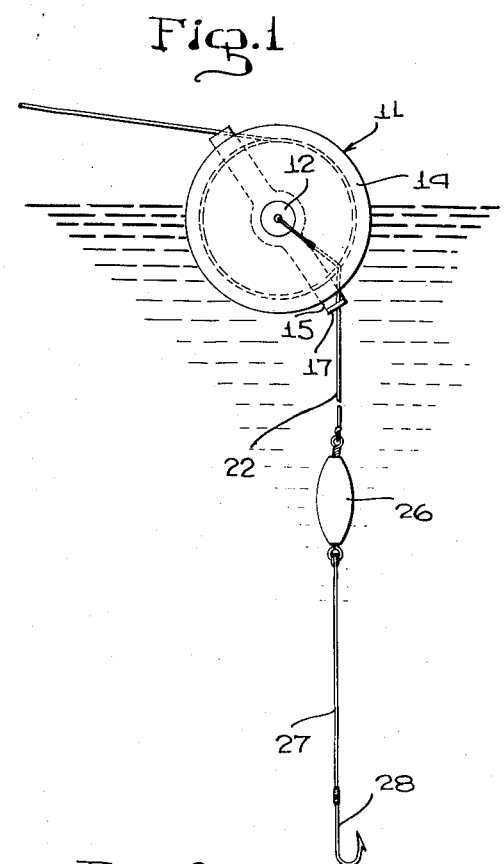
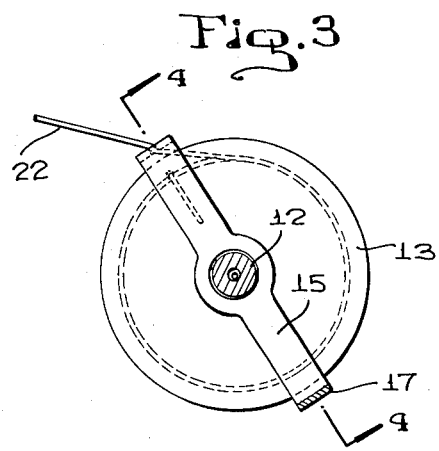
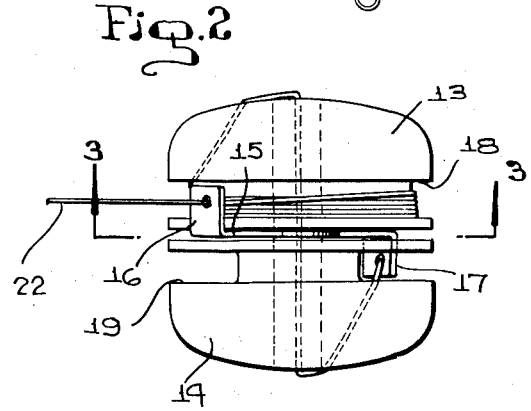
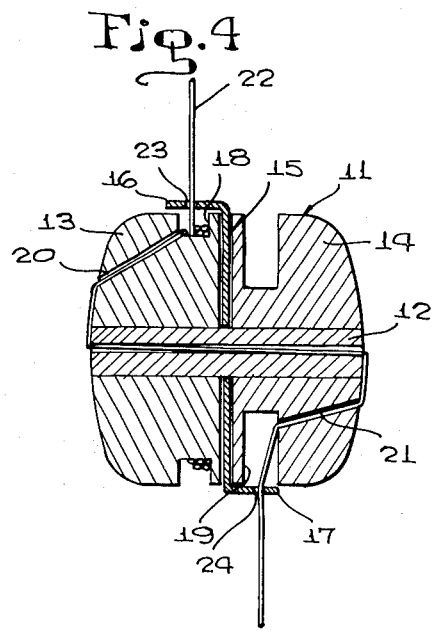
INVENTOR.
GEORGE M. YULICH
BY
McMorrow, Berman + Davidson
ATTORNEYS

United States Patent Office 2,734,304
Patented Feb. 14, 1956

2,734,304

DIFFERENTIAL FLOAT

George M. Yulich, Kansas City, Kans.

Application September 22, 1953, Serial No. 381,535

3 Claims. (Cl. 43—43.11)

This invention relates to fishing floats, and more particularly to an improved fishing float of the type which will let out a predetermined amount of line desired for depth after a cast has been made.

A main object of the invention is to provide a novel and improved fishing float which will let out a predetermined amount of line after the float has been cast into the water, the improved fishing float being simple in construction, involving relatively few parts, and being reliable in operation.

A further object of the invention is to provide an improved fishing float having means for allowing a predetermined length of line to be let out after the float has been cast, which will raise said line when the float is pulled by the fisherman, which is sturdy in construction, and which is smooth in action.

Further objects and advantages of the invention will become apparent from the following description and claims, and from the accompanying drawings, wherein:

Figure 1 is a side elevational view showing a fishing float according to the present invention in operating position.

Figure 2 is an enlarged top view of the fishing float shown in Figure 1.

Figure 3 is a vertical cross sectional view taken on the line 3—3 of Figure 2.

Figure 4 is a transverse cross sectional view taken on the line 4—4 of Figure 3.

Referring to the drawings, the illustrated fishing float is designated generally at 11 and comprises a hollow shaft 12 on which is fixedly secured a pair of grooved pulleys 13 and 14, the inner faces of said pulleys being spaced apart. Rotatably mounted on the shaft 12 between the inner faces of pulleys 13 and 14 is a flat guide bar 15 which is formed at its ends with the respective apertured flange elements 16 and 17 overlying the respective grooves 18 and 19 in the pulleys 13 and 14. The respective pulleys 13 and 14 are formed with the respective inclined passages 20 and 21 connecting the grooves 18 and 19 with the respective outer surfaces of said pulleys.

Designated at 22 is the fishing line, said line being engaged through the aperture 23 in the flange element 16, through the passage 20 to the left side of the device, as viewed in Figure 4, thence through the tubular shaft 12 to the right side of the device, and thence through the passage 21 and the aperture 24 in the flange element 17. The end of the fishing line 22 is connected to one end of a conventional sinker 26, and the leader 27 to which is connected the hook 28 is attached to the opposite end of the sinker 26, as shown in Figure 1.

In using the device, before the line is engaged through the aperture 24 of the flange element 15, a predetermined length of the line is wound in the groove 19, in accordance with the desired depth to which the sinker 26 and hook 28 must descend, the line being then engaged through the aperture 24 and attached to the sinker 26. When the cast is made, the weight of the sinker 26 will cause the line to unwind from the groove 19, causing the reels 13 and 14 to be simultaneously rotated, whereby the fiishing line will be wound up in the groove 18 as it unwinds from the groove 19. This takes up the slack in the cast, and at the same time allows the sinker 26 carrying the hook 28 to descend freely to the desired depth. When the line is reeled in, the line unwinds from the groove 18, causing the line to be simultaneously wound up in the groove 19, whereby the sinker 26 and hook 28 are raised to a position a short distance below the float, such as that shown in Figure 1.

The groove 19 is preferably made substantially deeper than the groove 18 to insure that the groove 19 may be able to carry more line than the groove 18, whereby the sinker 26 will be suspended a short distance below the float when all the line in the groove 18 is unwound, thus insuring that the top end of the sinker 26 will not become locked in the aperture 24 of the flange element 17 when the line is reeled in.

While a specific embodiment of an improved fishing float has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a fishing line having a sinker secured to the free end thereof, a fishing float comprising a hollow shaft, a pair of grooved pulleys fixedly secured on said shaft, the line extending through said shaft and through the end portions of said pulleys to the grooves thereof, whereby the line may be wound in said grooves, a guide bar rotatably mounted on the shaft between the pulleys, and respective apertured end flanges on said guide bar overlying the respective grooves, the line passing through the apertures in said flanges, whereby the line is guided for winding in said grooves responsive to rotation of said float.

2. In combination with a fishing line having a sinker secured to the free end thereof, a fishing float comprising a hollow shaft, a pair of grooved pulleys fixedly secured on said shaft, the inside surfaces of said pulleys being spaced apart from each other, the line extending through said shaft and through the end portions of said pulleys to the grooves thereof, whereby the line may be wound in said grooves, a guide bar rotatably mounted on the shaft between the inside surfaces of the pulleys, and respective apertured end flanges on said guide bar overlying the respective grooves in the pulleys, the line passing through the apertures in said flanges, whereby the line is guided for winding in said grooves responsive to rotation of said float, said grooves being of different depths.

3. In combination with a fishing line having a sinker secured to the free end thereof, a fishing float comprising a tubular shaft, a pair of grooved pulleys fixedly secured on said shaft, the inside surfaces of said pulleys being spaced apart from each other, the line extending through said shaft and through the end portions of said pulleys to the grooves thereof, whereby the line may be wound in said grooves, a guide bar rotatably mounted on the shaft between the inside surfaces of the pulleys, and respective apertured end flanges on said guide bar overlying the respective grooves in the pulleys, the line passing through the apertures in said flanges, whereby the line is guided for winding in said grooves responsive to rotation of said float, the groove in the pulley adjacent the free end of the line being substantially deeper than the groove in the other pulley.

References Cited in the file of this patent

UNITED STATES PATENTS

| | | |
|---|---|---|
| 1,322,407 | Chegwidden et al. | Nov. 18, 1919 |
| 2,421,466 | Schenavar | June 3, 1947 |
| 2,473,107 | Mendelsohn | June 14, 1949 |
| 2,479,642 | Schiffman | Aug. 23, 1949 |
| 2,603,905 | Brzezinski | July 22, 1952 |